(12) United States Patent
Ha et al.

(10) Patent No.: US 9,843,559 B2
(45) Date of Patent: *Dec. 12, 2017

(54) METHOD FOR DETERMINING VALIDITY OF COMMAND AND SYSTEM THEREOF

(71) Applicant: NAVER Corporation, Seongnam-si, Kyunggi-do (KR)

(72) Inventors: Jung Soo Ha, Seoul (KR); Jung Su Kim, Seoul (KR); Woo-Sung Lee, Seoul (KR)

(73) Assignee: NAVER CORPORATION, Gyeonggi-do (KR)

( * ) Notice: Subject to any disclaimer, the term of this patent is extended or adjusted under 35 U.S.C. 154(b) by 107 days.

This patent is subject to a terminal disclaimer.

(21) Appl. No.: 14/532,662

(22) Filed: Nov. 4, 2014

(65) Prior Publication Data

US 2015/0156169 A1    Jun. 4, 2015

Related U.S. Application Data

(63) Continuation of application No. 11/570,236, filed as application No. PCT/KR2005/001713 on Jun. 8, 2005, now Pat. No. 8,909,795.

(30) Foreign Application Priority Data

Jun. 8, 2004  (KR) ........................ 10-2004-0041621

(51) Int. Cl.
*G06F 15/16* (2006.01)
*H04L 29/12* (2006.01)
*G06F 17/30* (2006.01)

(52) U.S. Cl.
CPC .... *H04L 61/6068* (2013.01); *G06F 17/30887* (2013.01)

(58) Field of Classification Search
CPC ........... H04L 61/6068; H04L 25/03949; G06F 9/45512; G06F 3/0659; G06F 17/30887
(Continued)

(56) References Cited

U.S. PATENT DOCUMENTS 6,701,514 B1 *  3/2004  Haswell ............. G06F 11/3664
                                                707/999.102
7,136,860 B2 *  11/2006  Doliov ............. G06F 17/30867
(Continued)

FOREIGN PATENT DOCUMENTS

JP    2002024127 A    1/2002
KR    20000049795 A   8/2000
(Continued)

*Primary Examiner* — Tu Nguyen
(74) *Attorney, Agent, or Firm* — Harness, Dickey & Pierce, P.L.C.

(57) ABSTRACT

Disclosed are method and system for determining the validity of a command line, comprising the steps of: maintaining a first IP address database including first IP address information or at least one terminal specification information associated with the first IP address information, in which the first IP address information includes IP address information of a proxy server or that of a terminal using a dynamic IP address; receiving a command line from a terminal of a user; extracting a request content, second IP address information, or second terminal specification information included in the command line; generating log information including the request content, the second IP address information, the second terminal specification information or input time point information with respect to the input time point of the command line recording the log information associated with the command line in a log database; identifying the terminal by referring to the first IP address database and the log database; and determining the validity of the command line in association with the identified terminal.

5 Claims, 9 Drawing Sheets

(58) Field of Classification Search
USPC .......................................................... 709/228
See application file for complete search history.

(56) References Cited

U.S. PATENT DOCUMENTS

| | | | |
|---|---|---|---|
| 7,194,519 B1* | 3/2007 | Muhlestein | H04L 67/303 709/215 |
| 7,356,841 B2 | 4/2008 | Wilson et al. | |
| 7,421,733 B2* | 9/2008 | Glassman | G06F 21/31 713/163 |
| 7,516,487 B1 | 4/2009 | Szeto et al. | |
| 7,620,959 B2* | 11/2009 | Snover | G06F 9/45512 715/762 |
| 7,673,340 B1 | 3/2010 | Cohen et al. | |
| 7,725,545 B2* | 5/2010 | Rusche | H04L 12/585 709/206 |
| 8,065,133 B1* | 11/2011 | Asbridge | G06F 11/261 703/23 |
| 8,065,258 B2 | 11/2011 | Kim | |
| 8,201,252 B2* | 6/2012 | Chuah | H04L 47/10 705/51 |
| 8,756,188 B2 | 6/2014 | Kim | |
| 8,909,795 B2* | 12/2014 | Ha | G06F 17/30887 709/228 |
| 2001/0037314 A1 | 11/2001 | Ishikawa | |
| 2002/0002445 A1* | 1/2002 | Doliov | G06F 17/30867 703/2 |
| 2002/0009078 A1 | 1/2002 | Wilson et al. | |
| 2002/0073046 A1 | 6/2002 | David | |
| 2002/0144187 A1* | 10/2002 | Morgan | G06F 11/0748 714/43 |
| 2003/0041136 A1* | 2/2003 | Cheline | H04L 29/06 709/223 |
| 2003/0110394 A1 | 6/2003 | Sharp et al. | |
| 2003/0137974 A1* | 7/2003 | Kwan | H04L 45/02 370/352 |
| 2003/0149900 A1* | 8/2003 | Glassman | G06F 21/31 726/6 |
| 2003/0191590 A1* | 10/2003 | Narayan | H04L 12/2697 702/68 |
| 2004/0143670 A1* | 7/2004 | Roychowdhury | H04L 63/1458 709/229 |
| 2004/0153365 A1 | 8/2004 | Schneider et al. | |
| 2004/0177276 A1 | 9/2004 | MacKinnon et al. | |
| 2004/0230987 A1* | 11/2004 | Snover | G06F 9/45512 719/320 |
| 2004/0254813 A1 | 12/2004 | Messer | |
| 2005/0091424 A1* | 4/2005 | Snover | G06F 9/45512 710/33 |
| 2005/0091586 A1* | 4/2005 | Snover | G06F 9/45512 715/248 |
| 2005/0198330 A1 | 9/2005 | Kawabata et al. | |
| 2006/0013217 A1* | 1/2006 | Datla | H04L 41/0213 370/389 |
| 2006/0074618 A1* | 4/2006 | Miller | G06F 9/45504 703/13 |
| 2006/0112111 A1 | 5/2006 | Tseng et al. | |
| 2007/0245029 A1* | 10/2007 | Ha | G06F 17/30887 709/228 |
| 2007/0263773 A1* | 11/2007 | Malik | H04L 12/2697 379/1.01 |
| 2007/0266137 A1* | 11/2007 | Malik | H04L 43/50 709/223 |
| 2008/0005084 A1* | 1/2008 | Ha | G06F 17/30887 |
| 2008/0120521 A1* | 5/2008 | Poisson | G06F 11/2294 714/26 |
| 2008/0126918 A1* | 5/2008 | Boardman | G06F 11/3664 714/819 |
| 2009/0204560 A1* | 8/2009 | Kim | G06F 11/0709 706/47 |
| 2009/0260083 A1* | 10/2009 | Szeto | H04L 63/0263 726/22 |
| 2012/0254127 A1 | 10/2012 | Kim | |

FOREIGN PATENT DOCUMENTS

| | | |
|---|---|---|
| KR | 20010086259 A | 9/2001 |
| KR | 20030001357 A | 1/2003 |
| WO | WO-2005122018 A1 | 12/2005 |

* cited by examiner

FIG. 3

| FIRST IP ADDRESS INFORMATION | FIRST TERMINAL SPECIFICATION INFORMATION | | | | |
|---|---|---|---|---|---|
| | TYPE OF OS | VERSION OF OS | TYPE OF WEB BROWSER | VERSION OF WEB BROWSER | ... |
| 123.123.123.123 | windows | XP | Netscape Communicator | 4.5 | ... |
| | X window | ... | Internet Explorer | 6.0 | ... |
| | ... | ... | ... | ... | ... |
| 254.254.254.254 | ... | ... | ... | ... | ... |
| | ... | ... | ... | ... | ... |

| IP ADDRESS INFORMATION | INPUT TIME POINT INFORMATION | CONTENT INFORMATION (REQUEST CONTENT INCL.) | ... |
|---|---|---|---|
| 123.123.123.123 | 2004/04/16, 02:30:25 | ACCESS MAIN PAGE | ... |
| | 2004/04/16, 02:31:02 | INPUT SEARCH QUERY | ... |
| | 2004/04/16, 02:31:40 | ACCESS FIRST WEBPAGE INCLUDING SEARCH RESULT LIST | ... |
| | 2004/04/16, 02:32:16 | SELECT SEARCH RESULT | ... |
| | ... | ... | ... |

METHOD FOR DETERMINING VALIDITY OF COMMAND AND SYSTEM THEREOF

PRIORITY INFORMATION

This application is a continuation of, and claims priority under 35 U.S.C. §120 to, U.S. National application Ser. No. 11/570,236, filed Dec. 7, 2006, which claims benefit of National phase of PCT/KR2005/01713, filed Jun. 8, 2005 which further claims priority under 35 U.S.C. §120 to Korean Application No. KR 10-2004-0041621, filed Jun. 8, 2004, the entire contents of each of which are incorporated herein by reference.

TECHNICAL FIELD

The present invention relates to a method for identifying a terminal having inputted a predetermined command line and determining the validity of the command line in association with the identified terminal, and a system thereof.

BACKGROUND ART

In a server/client model, a client accesses a server through a communication network and inputs a predetermined request in a user terminal. The server responds to the user terminal in correspondence to the request.

At this time, the user may input the request not for the purpose of obtaining the response, but for another purpose.

For example, a search server providing search service may statistically analyze the search request of the user and use the analyzed search request in order to generate and provide a search result list in accordance with preference of the user. A search result that the user provided with the search result list "frequently" selects may be considered to be highly relevant to the search request. Also, the preference of users about the search result may be considered to be very high. Thus, the search server gives priority to the search result in order to preferentially provide the search result to users with regard to the search request.

In this case, "a selection of a search result" of the user is usedg13 as "a request for receiving information associated with the search result or accessing a webpage associated with the search result" or "a standard for generating a search result list". A user knowing the above fact well may repeatedly select the same search result from the search result list provided in response to a predetermined search query. In this manner, the priority is given to the search result selected by the user. Of course, in case that the priority is given in such a manner that the user repeatedly selects the search result with malicious intent, the original purpose of preferentially providing a search result which is highly relevant to a search request and preferred by users cannot be obtained.

Accordingly, in case that a user inputs a request for selecting a search result, the search server is required to determine whether the request is inputted with malicious intent. In case that it is determined that the request is inputted with malicious intent, information associated with the search result is provided as per the request, but, is preferable not to be used as a standard for generating a search result list. Like above, it may be necessary to determine whether "a request" of a user inputted into a predetermined system is generated with malicious intent, which is against the object of the system.

Hereinafter, the term "command" used in the present specification is an inclusive concept including "a request" of a user for performing a predetermined operation in a predetermined server system, "a conversation" of a user or the "information" itself for providing predetermined information to the server system. The "command" may be transmitted to the server system by transmitting "a command line" from a terminal of the user to the server system.

Korean Patent Application No. 10-2002-7010554 ("Title: A system and method to determine the validity of a conversation on a network, hereinafter, referred to as "application invention") discloses one of methods for determining the validity of a command of a user. The Korean Patent Application designates a conversation inputted with malicious intent of a user as "an illegal conversation" in the specification.

The application invention includes the steps of 1) collecting data including "collective method data" and "private characteristic data" from a user conversation on a network, 2) storing data in a database, 3) constructing an estimation model using collective method data and private characteristic data in order to identify an illegal conversation with a network, and 4) identifying the illegal conversation in the database by using the estimation model.

Also, the application invention discloses 'the number of a private IP address per unit time/search list click', 'the number of a private IP address per unit time/entry source', and 'the number of a private IP addresses per unit time/advertiser accepting a chargeable click' as "collective method data".

Also, the application invention discloses 'an IP address of a click generating an income' and 'a time stamp of a click generating an income' as "private characteristic data".

Like above, the application invention adopts a method of identifying an illegal conversation by using "a private IP address". In case that the private IP address is used to identify an illegal conversation such above, it is easy to identify the illegal conversation by using a terminal having the private IP address when a user inputs the illegal conversation constantly.

However, while the population of using the Internet increases, there is a problem that an IP address is short when it is allocated to a terminal of each user in accordance with an address system of existing IPv4. In order to solve the problem, a method of allocating an IP address by using NAT, NAPT, and the like is widely used. According to the method such above, an IP address allocated to a predetermined terminal is dynamic.

In case that a private IP address changes too often or the private IP address of a terminal is hardly recognizable, such as for example, a terminal accessing a private network using a dynamic IP address or a terminal accessing through a proxy server, there is a problem that a method for identifying an illegal conversation just like in the application invention does not work well.

Accordingly, in case that it is difficult to identify each of terminals inputting each of command lines, such as, a terminal got access to a private network or a terminal accessing through a proxy server, there is required a method capable of identifying the command line illegally inputted from the terminal when it is inputted.

DISCLOSURE OF INVENTION

Technical Goals

The present invention provides method and system for determining the validity of a command line, which can identify a terminal inputting a command line and determine the validity of the command line in association with the identified terminal.

The present invention also provides method and system for determining the validity of a command line, which also can identify a terminal accessing through a proxy server or a terminal accessing a private network by further using specification information of a terminal, besides IP address information included in the command line, in order to identify the terminal having inputted the command line.

The present invention also provides method and system for determining the validity of a command line, which can suggest various determination standards capable of determining the validity of the command line in association with the identified terminal.

TECHNICAL SOLUTIONS

In order to achieve the above goals and solve the problems in the prior art, according to an aspect of the present invention, there is provided a method for determining validity of a command line, including the steps of: maintaining a first IP address database including first IP address information or at least one terminal specification information associated with the first IP address information, in which the first IP address information includes IP address information of a proxy server or that of a terminal using a dynamic IP address; receiving a command line from a terminal of a user; extracting a request content, second IP address information, or second terminal specification information included in the command line; generating log information including the request content, the second IP address information, the second terminal specification information or input time point information with respect to the input time point of the command line; recording the log information associated with the command line in a log database; identifying the terminal by referring to the first IP address database and the log database; and determining the validity of the command line in association with the identified terminal.

Also, according to another aspect of the present invention, the step of maintaining the first IP address database includes the steps of: searching for log information recorded in the log database for a certain period; searching the searched log information for log information including predetermined second IP address information, in which the predetermined second IP address information is selected from second IP address information included in the searched log information; extracting second terminal specification information included in the searched log information, respectively; classifying the extracted second terminal specification information by terminal specification; recording the second IP address information in the first IP address database in case that the extracted second terminal specification information is classified into two or more groups; and recording the extracted second terminal specification information by terminal specification in the first IP address database, in association with the second IP address information.

Explanation of Terms Used in the Present Specification

Prior to description about each of embodiments of the present invention, terms used in the present specification will be explained as follows.

1) First IP Address Information:

The term "first IP address information" used in the present specification is IP address information included in a first IP address database. With respect to IP address information included in a transmitted command line, a determination server can determine the first IP address information by determining i) whether an IP address of a terminal having transmitted the command line is a dynamic IP address, or ii) whether IP address information about a terminal having transmitted the command line is different from that included in the command line.

2) Second IP Address Information:

The term "second IP address information" used in the present specification is IP address information included in a command line which is inputted into a determination server from a terminal of a user. Thus, the first IP address information is selected from second IP address information.

3) Identified Terminal

In case that a predetermined command line is inputted into a determination server, the determination server identifies a terminal having inputted the command line. The term "identified terminal" in the present specification is used for identifying a terminal having inputted each of command lines, in case that a plurality of command lines are inputted into the determination server from a plurality of terminals. For example, when it is possible to determine that "a terminal having inputted this command line is same to the terminal having inputted that command line", it can be said that the 25 terminal is identified.

BRIEF DESCRIPTION OF DRAWINGS

FIG. 3 is a diagram illustrating one example of data included in a first IP address database, in an embodiment of the present invention;

FIG. 6 is a diagram illustrating one example of a log database recorded in a predetermined storage device, in an embodiment of the present invention;

BEST MODE FOR CARRYING OUT THE INVENTION

Hereinafter, the present invention will be in detail described with reference to the accompanying drawings.

Figure 1:
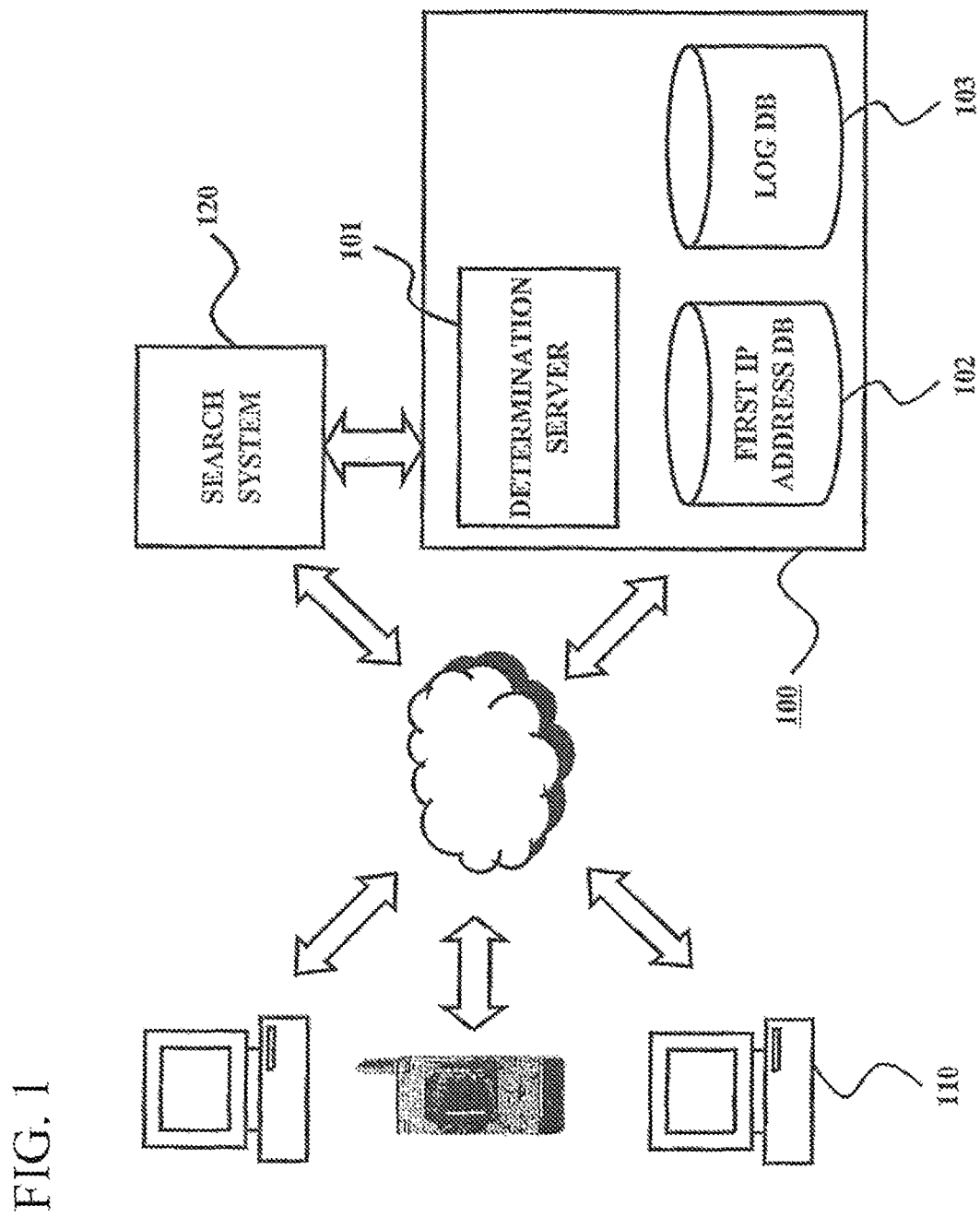
FIG. 1 is a diagram illustrating network connection of a determination system performing a command line validity determination method according to the present invention.

FIG. 1 is a diagram illustrating network connection of a determination system performing a command line validity determination method according to the present invention. A determination system 100 includes a determination server 101, a first IP address database 102, and a log database 103. Also, the determination system 100 may be connected to a user terminal 110 through a wired/wireless communication network. The determination server 101 processes a command line inputted from a user and transmits a response thereto to the user.

Hereinafter, it will be described the determination system 100 determining the validity of a command line, in case that a user inputs the command line associated with a search into a search server providing search service. However, this is only an illustrative example, and a server 120 indicates a server providing various services such as search services, game services, booking services, and the like in accordance with each client/server model.

Also, the determination server 101 for determining the validity of a command line (or command) of a user may be embodied as the same apparatus as the search server 120. Or, the determination server 101 interoperates with the search server 120.

Figure 2:
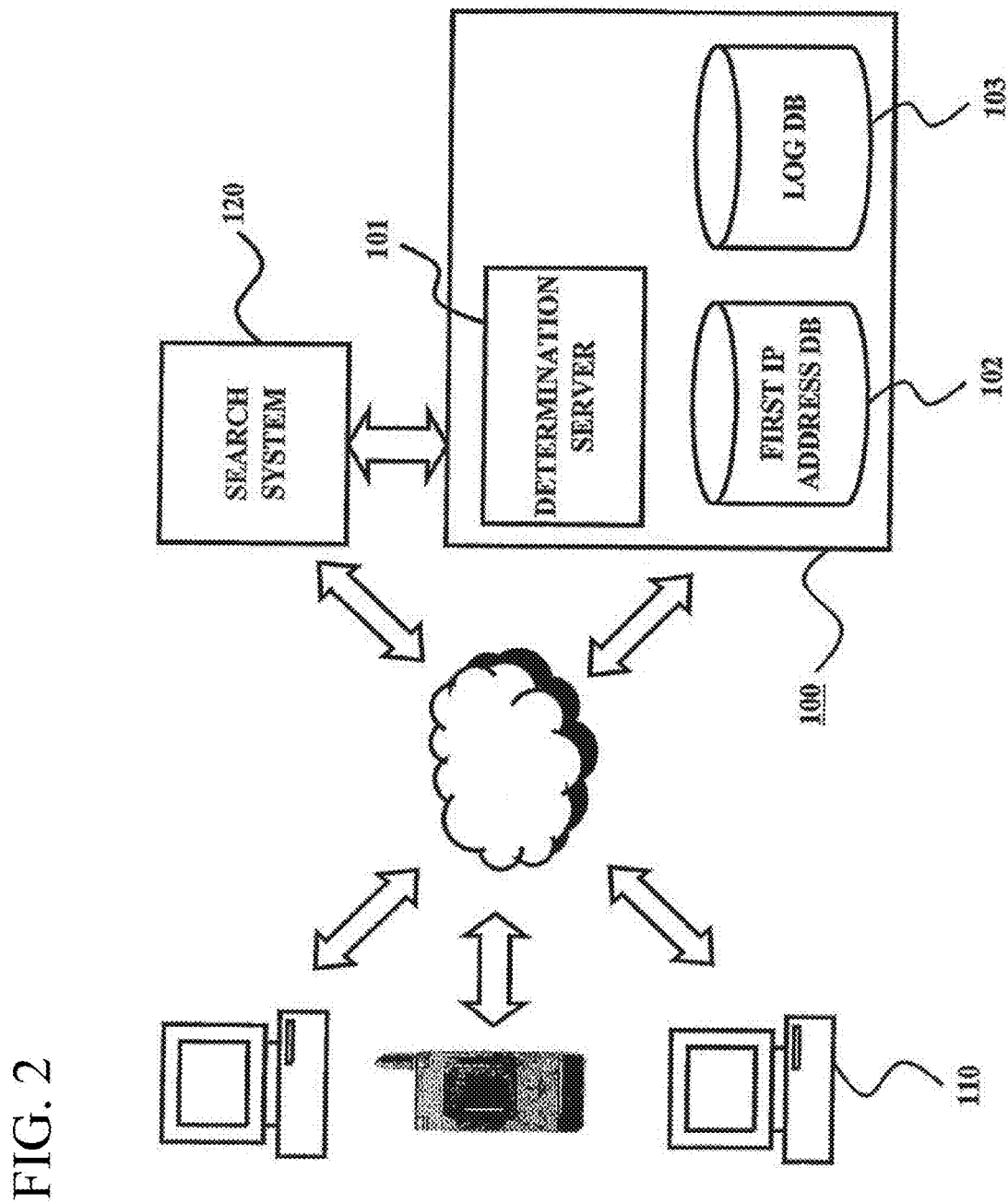
FIG. 2 is a flowchart illustrating a method for determining the validity of a command line according to an embodiment of the present invention.

FIG. 2 is a flowchart illustrating a method for determining the validity of a command line according to an embodiment of the present invention.

In step 201, the determination system 100 maintains the first IP address database 102 and the log database 103.

Predetermined first IP address information and first terminal specification information associated therewith are included in the first IP address database 102. According to an embodiment of the present invention, in case that an IP address of a terminal inputting a command line is not identical to IP address information included in the command line inputted from the terminal, such as for example, the terminal accessing the determination server 101 through a proxy server (not illustrated), the first IP address information is determined as IP address information included in the command line.

Also, according to another embodiment of the present invention, in case that an IP address of a terminal inputting a command line, such as the IP address of the terminal using a private network, is dynamically determined, the first IP address information is determined as IP address information included in the command line inputted from the terminal.

Also, first terminal specification information associated with the first IP address information may be information about a type or version of an Operating System (OS) installed in the terminal, or information about a type or version of a web browser installed therein. The web browser generates a command line including the first terminal specification information according to Hyper Text Transfer Protocol (HTTP). The first terminal specification information is included in the command line with the first IP address information and transmitted to the determination server 101.

FIG. 3 is a diagram illustrating one example of data included in the first IP address database 102. The log database 103 includes log information associated with a command line. The log database 103 will be fully described later with reference to FIG. 6.

In step 202, a user inputs a command line into the determination server 101 using the terminal 110.

In step 203, the determination server 101 extracts a request content, second IP address information or second terminal specification information included in the command line. The request content may be, for example, a search request including a search query, or a link request for selecting a search result included in a search result list and linking to a webpage associated with the selected search result.

Also, 1) in case that the terminal 110 has a fixed IP address, the second IP address information is IP address information about the fixed IP address. 2) In case that the IP address of the terminal 110 is inputted through a proxy server, the second IP address information is IP address information about an IP address of the proxy server. Also, 3) in case that the terminal 110 accesses a private network, a gateway changes a private IP address of the terminal 110 included in the command line into an public IP address according to a method such as NAT (Network Address Translation), NAPT (Network Address and Protocol Translation), and the like. At this time, the second IP address information is IP address information about the public IP address. Generally, the public IP address allocated by the gateway is not determined to be fixed.

The second terminal specification information is information about specification of the terminal collected by a web browser installed in the terminal 110 and included in the command line, such as for example, a type or version of a web browser installed in the terminal 110.

In step 204, the determination server 101 generates log information including the request content, the second IP address information, the second terminal specification information, input time point information with respect to the input time point of the command line, and the like. Also, the determination server 101 adds the generated log information to the log database 103, thereby updating the same 103.

In steps 205 to 211, the determination server 101 identifies the terminal 110 by referring to the first IP address database 102 and the log database 103.

In step 205, the determination server 101 determines whether first IP address information corresponding to the second IP address information exists by referring to the first IP address database 102. In case of the above 2) and 3), it is highly possible that first IP address information corresponding to second IP address information included in the command line exists.

In step 207, in case that it is determined at step 206 that first IP address information corresponding to the second IP address information exists, the determination server 101 searches for first terminal specification information corresponding to the searched first IP address information by referring to the first IP address database 102.

For example, in case that IP address "123.123.123.123" is an IP address of a proxy server, although a plurality of terminals accesses the determination server 101 through the proxy server, ail the command lines transmitted from the terminals include first IP address information, "123.123.123.123". However, information about specification of each terminal accessing through the proxy server is various. It is different from the first IP address information. Thus, first terminal specification information also included in the command line including the first IP address information "123.123.123.123" is different for each terminal. Accordingly, as illustrated in FIG. 3, there may be a plurality of first terminal specification information which is associated with first IP address information "123.123.123.123" and includes respectively different information. That is, first terminal specification information having the number of terminals accessing through the proxy server as a maximum value and including different information may exist.

In step 208, the determination server 101 compares the searched first terminal specification information and the second terminal specification information. In step 210, in case it is determined at step 209 that first terminal specification information corresponding to the second terminal specification information, the terminal 110 can be identified by the second IP address information and the second terminal specification information included in the command line.

Referring to FIG. 3, in case that first IP address information corresponding to the second IP address information is "123.123.123.123", and first terminal specification information corresponding to the second terminal specification information is one indicated by drawing symbol 301, it can be determined that a command line including second IP address information "123.123.123.123" and second terminal specification information 301 has been inputted from the same terminal. Thus, it can be said that the terminal has been identified by the second IP address information and the second terminal specification information.

Meanwhile, command lines including the same second IP address information and the same terminal specification information may be inputted from respectively different terminal having the same terminal specification. However, it is also possible to reduce such possibility by dividing a type of terminal specification information into several items.

Also, in case that first IP address information corresponding to second IP address information included in the command line is not searched, a terminal having inputted the command line is identified to be a terminal using a fixed IP address by the second IP address information in step 211.

Also, when first IP address information corresponding to second IP address information included in the command line exists as a result of search in step 205, first terminal specification information corresponding to the first IP address information is searched in step 207. However, in case that first terminal specification information corresponding to second terminal specification information does not exist in the searched first terminal specification information as a result of comparison in step 208, the first IP database is updated by using the second terminal specification information in step 212.

The step 212 will be further described under the assumption that terminals 110a, 110b, and 110c having respectively different terminal specification exist as terminals using a predetermined proxy server. IP address information of the proxy server is included in the first IP address database 102 as first IP address information. First terminal specification information of the terminals 110a and 110b are also included in the first IP address database 102, respectively, in association with the first IP address information. At this time, in case that the terminal 110c accesses the determination server 101 through the proxy server for the first time, first terminal specification information corresponding to second terminal specification information included in the command line inputted from the terminal 110c does not exist However, since the first IP address information is included in the command line, the determination server 101 can find out that the terminal 110c uses the proxy server, but, has never accessed the determination server 101 so far. Thus, the determination server 101 adds terminal specification information of the terminal 110c to the first IP address database 102 as first terminal specification information, in association with the first IP address information, thereby updating the first IP address database 102.

According to the configuration such constructed, in case that the terminal 110 is identified as in the step 210 or 211, the determination server 101 can determine from which terminal a predetermined command line has been inputted.

In step 213, the determination server 101 determines the validity of the command line by using identified information about from which terminal the command line has been inputted.

Figure 4:
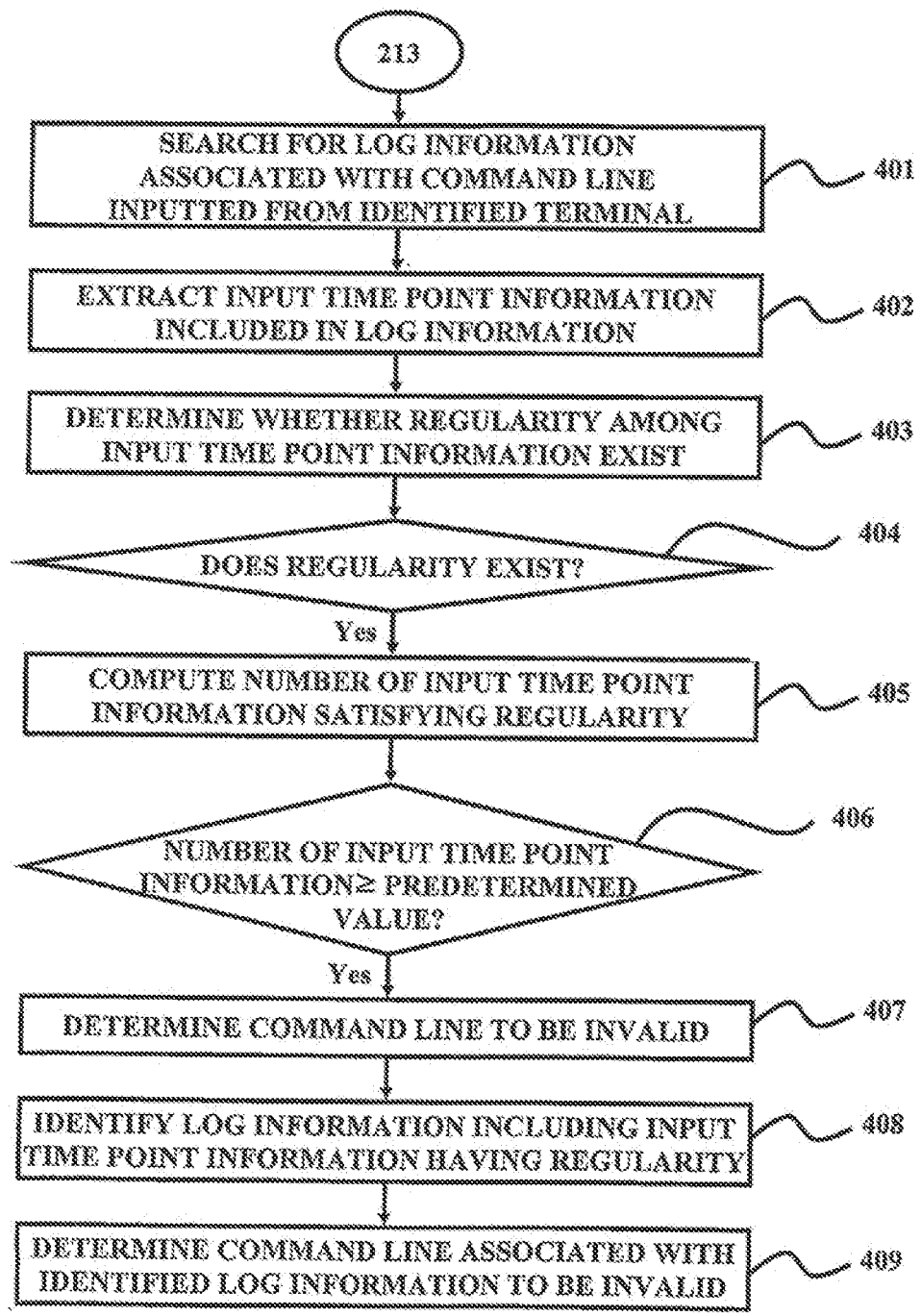
FIG. 4 is a flowchart illustrating procedures of determining the validity of a command line in association with an identified terminal, in an embodiment of the present invention.

Hereinafter, the step 213 of determining the validity of the command line will 10 be further fully described with reference to FIG. 4.

In step 401, the determination server 101 searches for log information associated with a command line inputted from a terminal having inputted the command line, by referring to the log database 103. In case that the terminal having inputted the command line is identified only by second IP address information just like in the step 211, the determination server 101 can search for log information including second IP address information included in the command line, thereby searching for log information associated with the command line inputted from the terminal.

Also, in case that the terminal having inputted the command line is identified by using second IP address information and second terminal specification information just like in the step 210, the determination server 101 can search for log information including second IP address information and second terminal identification information included in the command line, thereby searching for log information associated with the command line inputted from the terminal.

In step 402, the determination server 101 extracts input time point information included in the searched log information. For example, in case that the input time point of the command line is "2004/04/02, 09:00:30" and input time point information included in the searched log information is "2004/04/02, 08:50:30", "2004/04/02, 08:40:30", "2004/04/02, 08:30:30", and "2004/04/02, 08:20:30", respectively, it can be known that a command line associated with the searched log information has been inputted into the determination server 101 at intervals of ten minutes. That is, the command line has been inputted into the determination server 101 from the identified terminal at intervals of ten minutes.

In step 403, the determination server 101 determines whether the entire or a part of the extracted input time point information has relation according to a predetermined rule. Just like in the aforementioned embodiment, each of the extracted time point information has relation that the unit of "minute" increases at intervals of ten minutes. The regularity of the input time point information like above, may apply to all the cases in which mathematical regularity is found, for example, a case that the time interval increases by arithmetic sequence or geometric sequence, in addition to a case that the time interval between the input time points of inputting the command line is regular.

In case that it is determined at steps 403 and 404 that the entire or a part of input time point information has the regularity as described above, the determination server 101 can determine the command line to be invalid.

Also, according to another embodiment of the present invention, the determination server 101 computes the number of input time point information satisfying the regularity in step 405. In step 407, the determination server 101 determines the command line to be invalid in case it is determined at step 406 that the computed number of input time point information is more than a predetermined value. The determination server 101 does not determine the command line to be invalid in case that the computed number of input time point information is less than the predetermined value. Thus, it is possible to determine the validity of the command line more accurately.

Also, according to another embodiment of the present invention, the determination server 101 searches for log information associated with the command line inputted from the identified terminal for "a certain period" in the step 401 and sets up the certain period to be long enough. In this way, it is possible to determine the validity of the command line more accurately.

In step 408, the determination server 101 identifies log information including input time point information having relation according to the mathematical regularity such above. In step 409, the determination server 101 determines all the command lines associated with the identified log information to be invalid. Like above, in case that the mathematical regularity among the input time point of the command line is approved, it will be reasonable to determine not only the command line inputted this time but also command lines inputted previously of which mathematical regularity is approved, to be invalid.

Figure 5:
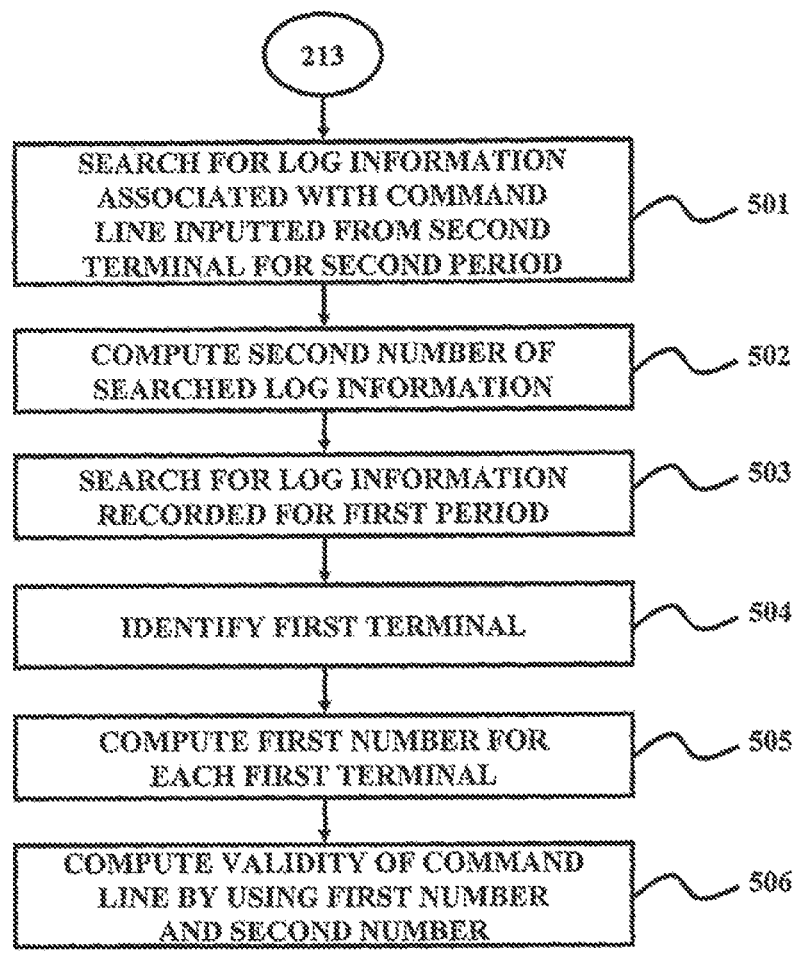
FIG. 5 is a flowchart illustrating procedures of determining the validity of a command line in association with an identified terminal, in another embodiment of the present invention.

Hereinafter, the specific configuration of determining the validity of the command line in the step 213 according to another embodiment of the present invention will be described with reference to FIG. 5.

Hereinafter, a terminal identified to have inputted the command line such above 5 is named as a second terminal.

In step 501, the determination server 101 searches for log information associated with a command line inputted from the second terminal for a second period by referring to the log database 103. In step 502, the determination server 101 computes the second number, which is the number of the searched log information.

For example, in case that a terminal having inputted the command line is identified by second IP address information "123.123.123.123" and second terminal specification information 301, log information associated with the command line inputted from the identified second terminal is log information including the second IP address information "123.123.123.123" and the second terminal specification information 301.

In step 503, the determination server 101 searches for log information recorded in the log database 103 for a first period. In step 504, the determination server 101 identifies a first terminal having inputted a command line associated with the searched log information by referring to the first IP address database 102. It is general that there exists a plurality of terminals having inputted command lines for the first period. Thus, a plurality of first terminals is identified. Also, a pair of "a first terminal and at least one piece of log information associated with the command line inputted from the first terminal" is identified by the step 504.

The first period may be same to the second period. It is preferable that the first period is longer than the second period. Also, the period of a certain period of time such as morning, afternoon, evening, midnight, and dawn is selected as the second period, thereby determining the validity of a command line by considering a pattern in which the command line is inputted for each period. For example, since the number of times that command lines are inputted significantly decreases around 4 a.m., the validity may be determined by reflecting this.

In case that first IP address information corresponding to second IP address information included in the searched log information is searched from the first IP address database 102, the determination server 101 identifies the first terminal by using second IP address information and second terminal specification information included in the log information. Also, in case that first IP address information corresponding to second IP address information included in the searched log information is not searched, the determination server 101 can identify the first terminal by using only second IP address information included in the log information.

In step 505, the determination server 101 computes the first number of log information associated with command lines inputted from the first terminal for the first period.

For example, in case that the number of log information including second IP address information and second terminal specification information is 30 in the searched log information, the number of command lines inputted from first terminals identified by the second IP address information and the second terminal specification information for the first period is 30.

The determination server 101 computes the first number for each identified terminal.

In step 506, the determination server 101 determines the validity of the command line by using the first number for said each first terminal and the second number.

For example, the determination server 101 computes the average of the first number for each identified terminal and compares the computed average with the second number which is computed in association with the second terminal having inputted the command line, thereby determining the validity of the command line. The determination server 101 may determine the command line to be invalid in case that the second number exceeds the average or a value in which a predetermined value is added to the average. Also, the determination server 101 computes the ratio of the second number to the average and determines the command line to be invalid in case that the ratio exceeds a certain value.

That is, in case that the average of the first number is 10 times and the second number is 100 times, it is highly possible to be determined that a user of the terminal has inputted an abnormal command line in a large number with malicious intent.

Also, the determination server 101 computes the maximum value of the first number for said each identified terminal, or computes the dispersion value of the first number for said each identified terminal. Also, the determination server 101 can determine the validity of the command line by comparing the second number with the maximum value or the dispersion value.

According to the configuration such constructed, in case of a terminal inputting a plurality of command lines abnormally in comparison with another terminal, the determination server 101 determines that a user of the terminal has inputted a plurality of illegal command lines and determines the command lines to be invalid.

In the meantime, it has been in detail described with respect to the case of using the first number for said each identified terminal, or an average thereof, etc. The above methods can be applied when the first number is compared with the second number and it is determined that the first number is abnormally more than the second number in each determination procedure which will be described later. Also, the specific method of comparing the first number with the second number as described above is only an illustrative example. The scope of the present invention is not limited thereto and reaches all the determination methods of determining the validity of a command line by comparing the first number having a predetermined meaning with the second number having another predetermined meaning.

Also, according to another embodiment of the present invention, the determination server 101 determines whether a terminal has inputted a command line including a predetermined request content abnormally in a large number, in comparison with other terminals, and thus, determines the validity of the command line. For example, there may be a case that the command lines selecting the identical search result are inputted from the identical terminal in a large number. Hereinafter, it will be described with respect to configuration in which the terminal inputting the command line including the predetermined request content in a large number is identified and in case that the command line including the request content is inputted from the terminal, the command line is determined to be invalid.

The determination server 101 searches for log information associated with a command line including the request content among command lines inputted for the second period, from the second terminal identified as a terminal having inputted the command line, by referring to the log database 103.

The determination server 101 searches log information recorded in the log database 103 for the first period, for log information including the request content included in the command line. Also, the determination server 101 identifies the first terminal having inputted the command line associated with the searched log information by referring to the first IP address information database 102.

The determination server 101 performs a process of computing the first number of log information associated with command lines inputted from the first terminals for the first period, by said each first terminal. In this manner, the determination server 101 computes the first number for each first terminal, respectively.

The determination server 101 determines the validity of the command line by using the first number for said each first terminal and the second number. Configuration of determining the validity of the command line by using the first number for said each terminal and the second number has been in detail described in the aforementioned embodiment. Thus, the further description related thereto will be omitted in the present embodiment.

Hereinafter, a method for determining the validity of a command line according to another embodiment of the present invention will be described. For example, in case that the command line includes a request content to select a search result about the keyword "flower delivery", the command line will be generated on the basis of a list of search results including the search result. That is, a precondition to generate the command line is to provide the use with the list of search results. Thus, in case that the user has inputted the command line including the request content to select the search result despite of the fact that the search server 120 had never provided the user with the list of search results, the command line should be determined to be invalid as an abnormally inputted command line.

In case that the command line has been normally generated, the determination server 101 determines whether the terminal 110 has inputted the command line in a state where the terminal 110 has accessed a first webpage on the basis of information provided thereon. In case that the terminal 110 has generated and transmitted the command line in a state where the terminal 110 has not accessed the first webpage, the determination server 101 determines the command line to be invalid. That is, whether "an exposure" of predetermined information and generation of the command line associated with the information, for example, "a click" of a mouse to generate the command line have occurred on the same webpage can be used as reference data.

Accordingly, the method for determining the validity of a command line according to the present embodiment should first perform the procedure of determining whether the terminal having accessed the first webpage is identical to one having inputted the command line, in order to determine whether the exposure and the click have occurred on the same webpage. Description related thereto has been described with reference to FIG. 2. "The terminal 110" used to describe the present embodiment is a terminal identified through the aforementioned process.

In the present embodiment, the determination server 101 generates log information associated with the command line inputted from the terminal 110 and log information associated with all the information communicated with the terminal 110. The determination server 101 records the generated log information in the log database 103.

FIG. 6 is a diagram illustrating one example of the log database 103 recorded in a predetermined storage device in the present embodiment. As illustrated in FIG. 6, the log database 103 can be recorded in the storage device for each IP address information. According to another embodiment of the present invention, the log database 103 can be recorded in order of time.

The determination server 101 identifies a first webpage associated with the command line by referring to the request content included in the command line. For example, in case that the request content is about selecting a search result from a keyword search result list with respect to "flower delivery", the determination server 101 can determine a webpage providing the keyword search result list as a first webpage and identify a URL of the first webpage.

The determination server 101 searches the log database 103 for log information associated with the terminal 110 and the identified first webpage. Also, since providing of the first webpage is a precondition to generate the command line, the determination server 101 searches the log information for log information which has been generated and recorded just before the input time point of the command line.

Thus, in case that it is determined that log information which is associated with the terminal 110 and the identified first webpage and is recorded before the input time point of the command line is not searched, the determination server 101 determines that the terminal 110 has inputted the command line in a state where the first webpage is not provided. Depending on the determination, the determination server 101 can determine the command line to be invalid as one which has been generated abnormally.

Methods of identifying a terminal having transmitted a command line inputted into the determination server 101, and determining the validity of the command line in association with the identified terminal have been described in detail, respectively. The determination server 101 can adopt at least one of the methods. Also, the determination server 101 can review determination results according to each of the determination methods and thus, determine the validity of the command line. Also, the determination server 101 can determine the validity of the command line by using the entire determination results which are computed by giving weight to each of the determination results.

In the meantime, the determination server 101 may give no answer to a command line which is determined to be invalid. Also, the determination server 101 may generate a predetermined effect with respect to the command line which is determined to be invalid. For example, in case that the command line is a request for selecting a search result from a list of search results provided by the search server 120, the search server 120 may transmit information associated with the selected search result to the terminal, irrespective of the validity or invalidity of the command line. At this time, in case that the command line is used as a criterion to charge an advertiser who provides advertising in association with the search result, or as a criterion to determine the preference of a user selecting the search result, the command line determined to be invalid may not be used as the criterion.

Figure 7:
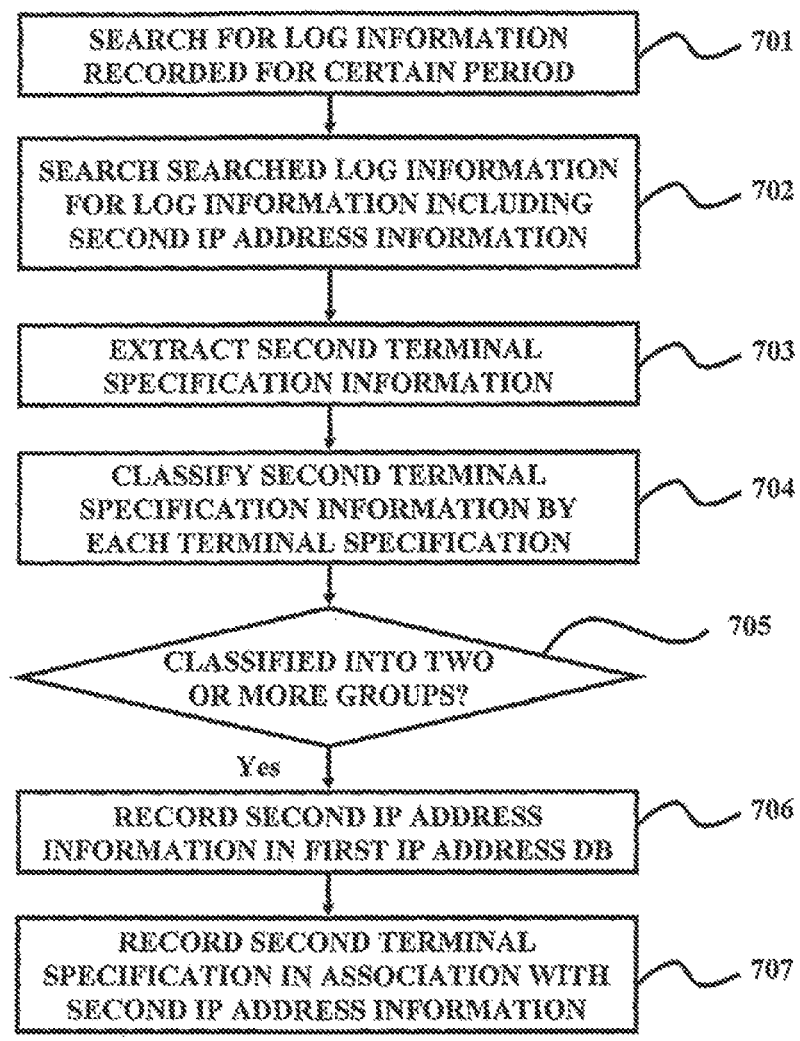
FIG. 7 is a flowchart illustrating procedures of maintaining a first IP address database, in an embodiment of the present invention.

Hereinafter, the procedures of maintaining the first IP address database 102 will be described with reference to FIG. 7.

In step 701, the determination server 101 searches for log information recorded in the log database 103 for a certain period. For example, the certain period may be 24 hours.

In step 702, the determination server 101 searches the searched log information for log information including predetermined second IP address information. The predetermined second IP address information is selected from second IP address information included in the searched log information.

In step 703, the determination server 101 extracts second terminal specification information included in the searched log information. In step 704, the determination server 101 classifies the extracted second terminal specification information by each 5 terminal specification.

For example, in case that the predetermined second IP address information is "234.234.234.234" and three pieces of log information including the second IP address information "234.234.234.234" are searched in step 701, and in case that second terminal specification information included in the three pieces of log information are 10 "Explorer 5.0", "Explorer 6.0", and "Explorer 5.0", respectively, the second terminal specification information is classified into two groups, such as the group of "Explorer 5.0" and the group of "Explorer 6.0".

In step 706, if it is determined at step 705 that the extracted second terminal specification information is classified into two or more groups such as described above, the determination server 101 records second IP address information "234.234.234.234" in the first IP address database 102. Also, in step 707, the determination server 101 records the second terminal specification information in the first IP address database 102, in association with second IP address information "234.234.234.234". At this time, the recorded second terminal specification information is not repeated.

As aforementioned, the first IP address database 102 is maintained and updated through the steps 701 to 707.

The embodiments of the present invention include computer readable media including program instructions to implement various operations embodied by a computer. The media may also include, alone or in combination with the program instructions, data files, data structures, tables, and the like. The media and program instructions may be those specially designed and constructed for the purposes of the present invention, or they may be of the kind well known and available to those having skill in the computer software arts.

Figure 8:
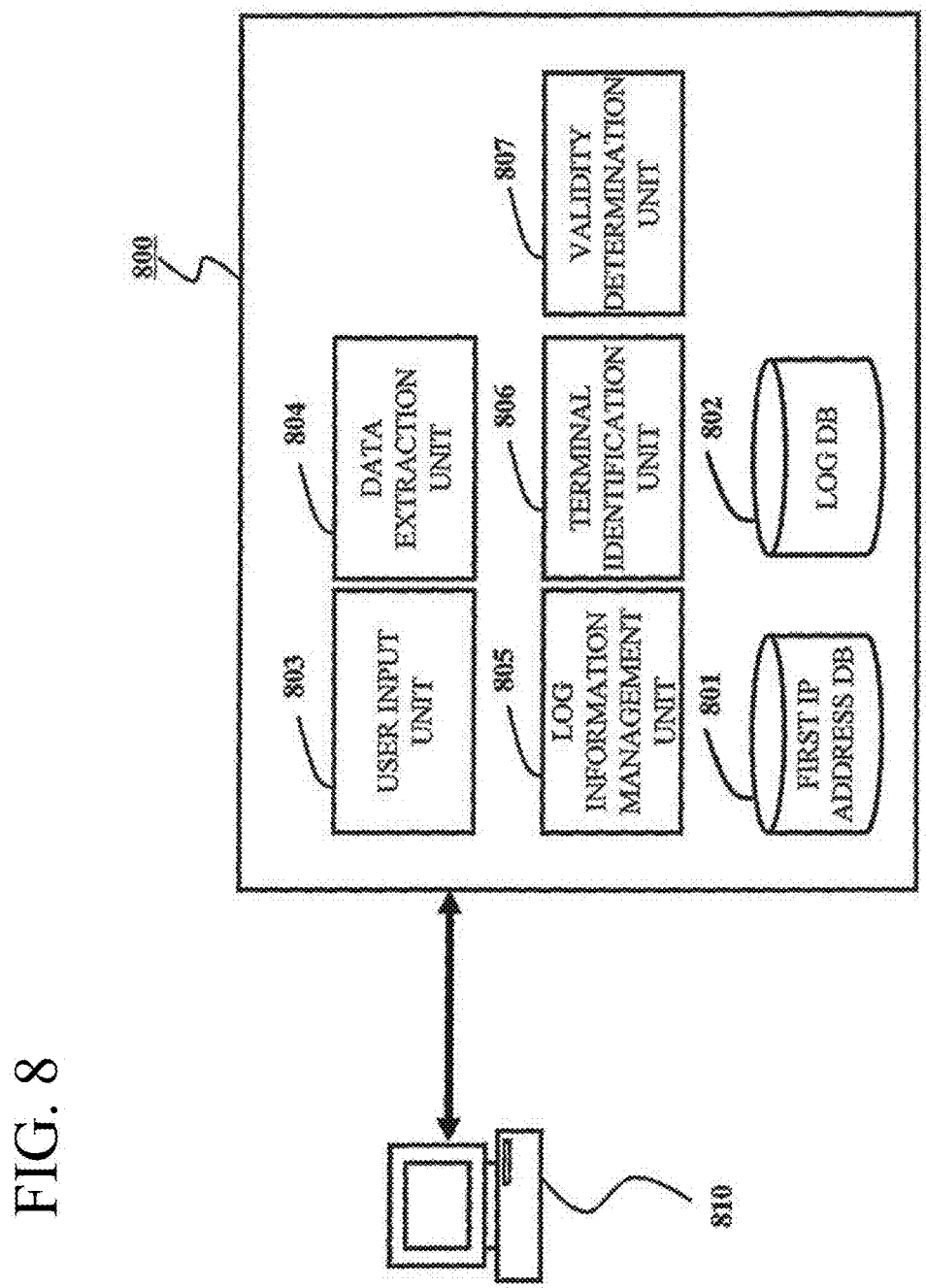
FIG. 8 is a block diagram illustrating an internal configuration of a determination system according to another embodiment of the present invention.

Hereinafter, the determination system 100 determining the validity of a command line according to another embodiment of the present invention will be described. FIG. 8 is a block diagram illustrating an internal configuration of the determination system 100. The determination systems 100 and 800 include a first IP address database 801, a log database 802, a user input unit 803, a data extraction unit 804, a log information management unit 805, a terminal identification unit 806, and a validity determination unit 807.

The first 1P address database 801 includes first IP address information and at least one piece of first terminal specification information associated with the first 1P address information. The first IP address information may be IP address information of a proxy server or that of a terminal using a dynamic IP address.

The log database 802 includes log information associated with a command line.

The user input unit 803 receives a command line from a terminal 810 of a user. The data extraction unit 804 extracts a request content, second 1P address information, or second terminal specification information included in the command line.

The log information management unit 805 generates log information including the request content, the second 1P address information, the second terminal specification information, or input time point information about the input time point of the command line. The log information management unit 805 records the generated log information in the log database 802, thereby updating the log database 802.

The terminal identification unit 806 identifies the terminal 810 by referring to the first IP address database 801 and the log database 802. The terminal identification unit 806 determines whether first IP address information corresponding to second IP address information included in the command line exists by referring to the first IP address database 801. In case that it is determined that first IP address information corresponding to the second IP address information does not exist, the terminal 810 is identified by the second IP address information. That is, log information including the second IP address information among log information recorded in the log database 802 is associated with the command line inputted from the terminal 810.

Also, in case that it is determined that first IP address information corresponding to the second IP address information exists, the terminal 810 is identified by the second IP address information and the second terminal specification information. That is, log information including the second IP address information and the second terminal specification information among log information recorded in the log database 802 is associated with the command line inputted from the terminal 810.

The validity determination unit 807 determines the validity of the command line in association with the terminal 810 identified such above. The configuration of identifying the terminal having inputted the command line and determining the validity of the command line has been in detail described in the aforementioned embodiment. Thus, further description related thereto will be omitted in the present embodiment.

Figure 9:
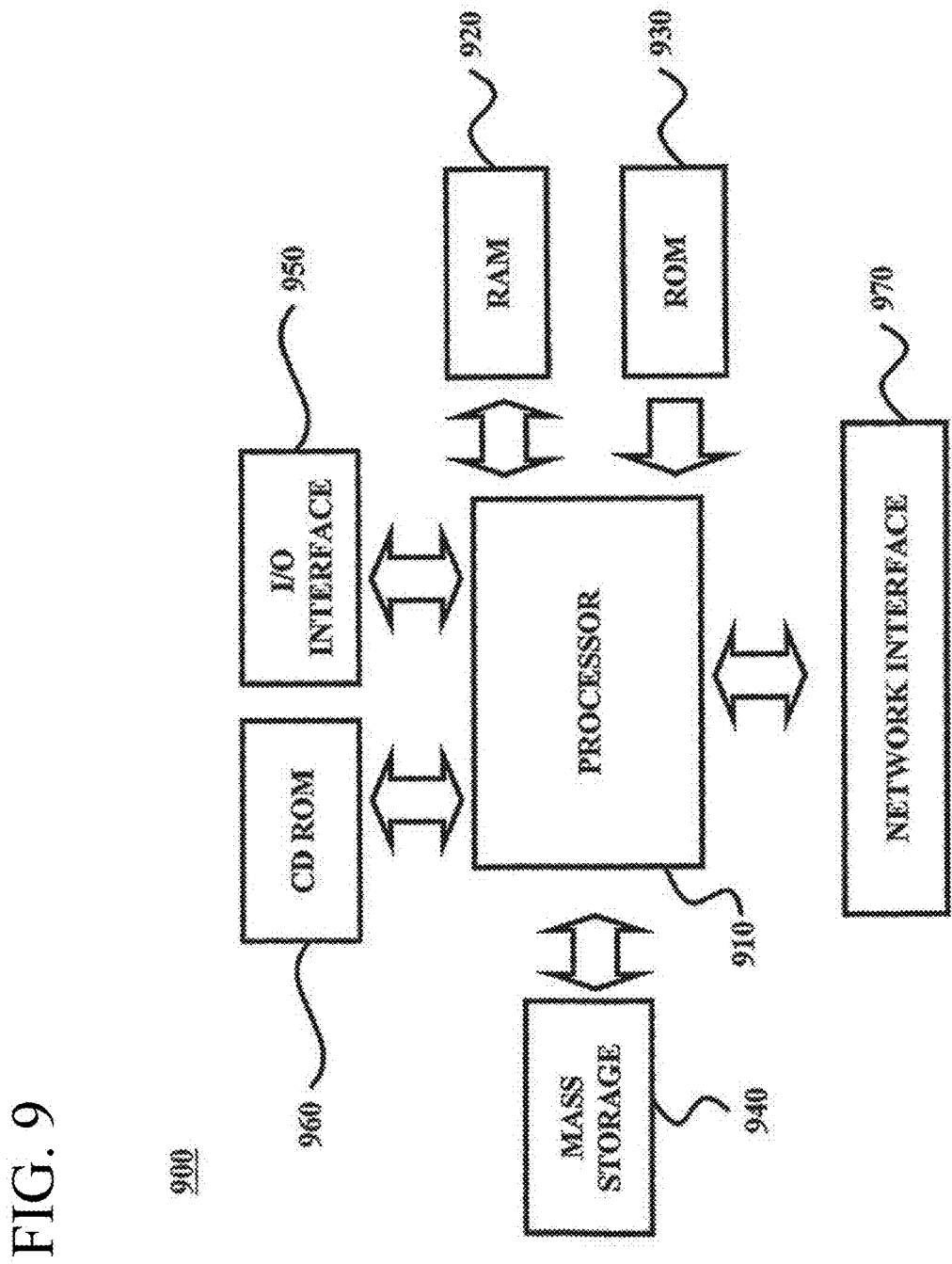
FIG. 9 is an internal block diagram of a general-purpose computer which can be employed in implementing the command line validity determination method according to the present invention.

FIG. 9 is an internal block diagram of a general-purpose computer which can be employed in implementing the command line validity determination method according to the present invention.

A computer apparatus 900 includes at least one processor 910 connected to a main memory device including a RAM (Random Access Memory) 920 and a ROM (Read Only Memory) 930. The processor 910 is also called as a central processing writ CPU. As well-known to the field of the art, the ROM 930 unidirectionally transmits data and instructions to the CPU, and the RAM 920 is generally used for bidirectionally transmitting data and instructions. The RAM 920 and the ROM 930 may include a certain proper form of a computer readable recording medium. A mass storage device 940 is bidirectionally connected to the processor 910 to provide additional data storage capacity and may be one of the computer readable recording medium. The mass storage device 940 is used for storing programs and data and is an auxiliary memory. A particular mass storage device such as a CD ROM 960 may be used. The processor 910 is connected to at least one input/output interface 950 such as a video monitor, a track ball, a mouse, a keyboard, a microphone, a touch-screen type display, a card reader, a magnetic or paper tape reader, a voice or hand-writing recognizer, a joy stick, and other known computer input/output unit. The processor 910 may be connected to a wired or wireless communication network via a network interface 970. The procedure of the described method can be performed via the network connection. The described devices and tools are well-known to those skilled in the art of computer hardware and software.

The hardware elements above may be configured to act as one or more software modules for implementing the operations of this invention.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching.

Therefore, it is intended that the scope of the invention be defined by the claims appended thereto and their equivalents.

Although the present invention has been described in connection with the embodiment of the present invention illustrated in the accompanying drawings, it is not limited thereto since it will be apparent to those skilled in the art that various substitutions, modifications and changes may be made thereto without departing from the scope and spirit of the invention.

As used in this application, the terms "unit" is intended to refer to, but is not limited to, a software or hardware component, which performs certain tasks. A unit or component may advantageously be configured to reside on the addressable storage medium and configured to execute on one or more processors. Thus, a unit may include, by way of example, components, such as software components, object-orientated software components, class components and task components, processes, functions, attributes, procedures, subroutines, segments of program code, drivers, firmware, microcode, circuitry, data, databases, data structures, tables, arrays, and variables. The functionality provided for in the units may be combined into fewer units or further separated into additional units. Moreover, nothing disclosed herein in intended to be dedicated to the public regardless of whether such disclosure is explicitly recited in the claims. No claim element is to be construed under the provisions of 35 U.S.C. Section 112, sixth paragraph, unless the element is expressly recited using the phrase "means for" or, in the case of a method claim, the element is recited using the phrase "step for."

INDUSTRIAL APPLICABILITY

According to the present invention, there is provided method and system for determining the validity of a command line, which can identify a terminal inputting a command line and determine the validity of the command line in association with the identified terminal.

Also, according to the present invention, there is provided method and system for determining the validity of a command line, which also can identify a terminal accessing through a proxy server or a terminal accessing a private network by further using specification information of a terminal, besides IP address information included in the command line, in order to identify the terminal having inputted the command line.

Also, according to the present invention, there is provided method and system for determining the validity of a command line, which can suggest various determination standards capable of determining the validity of the command line in association with the identified terminal.

The invention claimed is:

1. A computer-implemented method for determining a validity of a command line associated with request content using a processor, the method comprising:
    maintaining, by the processor, a first IP address database including at least one of first IP address information, each of the first IP address information associated with a terminal sending the command line;
    receiving, at the processor, a command line from a terminal, the command line including second IP address information, the second IP address information associated with an entity from which the command line was received;
    generating, via the processor, log information associated with the command line, the log information including the request content, the second IP address information, and input time point information with respect to an input time point of the command line;
    identifying, by the processor, the terminal based, at least in part, on the first IP address information in the first IP address database; and
    determining, by the processor, a validity of the command line in association with the identified terminal based on the log information, the determining including,
        determining a mathematical regularity between two or more input time points included in the input time point information, and
        determining the command line is invalid if a number of occurrences of the mathematical regularity exceeds a threshold.

2. The method of claim 1, wherein determining the validity of the command line comprises:
    identifying log information associated with the command line input from the identified terminal;
    extracting input time point information included in the identified log information; and
    determining the validity of the command line based, at least in part, upon the extracted input time point information, including determining the command line is invalid if at least a portion of the extracted input time point information has the mathematical regularity.

3. The method of claim 2, further comprising:
    identifying other log information including other input time point information having the mathematical regularity; and
    determining all previously inputted command lines associated with the identified other log information to be invalid.

4. A non-transitory computer readable storage medium comprising executable program code for determining a validity of a command line associated with request content using a processor, the program code, when executed by the processor, configures the processor to:
    maintain a first IP address database including first IP address information, each of the first IP address information associated with a terminal sending the command line;
    receive a command line from a terminal, the command line including second IP address information, the second IP address information associated with an entity from which the command line was received;
    generate log information associated with the command line, the log information including the request content, the second IP address information, and input time point information with respect to an input time point of the command line;
identify the terminal based, at least in part, on the first IP address information in the first IP address database; and
determine a validity of the command line in association with the identified terminal based on the log information, to determine including,
determine a mathematical regularity between two or more input time points included in the input time point information and
determine the command line is invalid if a number of occurrences of the mathematical regularity exceeds a threshold.

5. A system for determining a validity of a command line associated with request content, comprising:
a storage device;
a first IP address database stored on the storage device, the first IP address database including at least one of first IP address information, each of the first IP address information associated with a terminal sending the command line;
a user input unit configured to receive a command line from a terminal, the command line including second IP address information, the second IP address information associated with an entity from which the command line was received;
a log information management unit configured to generate log information associated with the command line, the log information including the request content, the second IP address information, and input time point information with respect to an input time point of the command line;
a terminal identification unit configured to identify the terminal based, at least in part, on the first IP address information in the first IP address database; and
a validity determination unit configured to determine a validity of the command line associated with the identified terminal based on the log information, to determine including,
determine a mathematical regularity between two or more input time points included in the input time point information, and
determine the command line is invalid if a number of occurrences of the mathematical regularity exceeds a threshold.

* * * * *